United States Patent [19]

Schiller et al.

[11] Patent Number: 4,633,611

[45] Date of Patent: Jan. 6, 1987

[54] PROCESS AND APPARATUS FOR DISINFECTING SEEDS

[75] Inventors: Siegfried Schiller; Siegfried Panzer; Klaus Gaber, all of Dresden, German Democratic Rep.

[73] Assignee: Bakish Materials Corporation, Englewood, N.J.

[21] Appl. No.: 687,804

[22] Filed: Dec. 31, 1984

[51] Int. Cl.$^4$ .................................................. A01C 1/08
[52] U.S. Cl. ......................................... 47/1.3; 47/58; 250/433
[58] Field of Search ............. 47/1.3, 57.6, 58, DIG. 8; 250/434, 438, 433, 492.3, 432 R; 435/173; 430/942

[56] References Cited

U.S. PATENT DOCUMENTS

| | | | |
|---|---|---|---|
| 2,333,842 | 11/1943 | Cascio et al. | 250/432 |
| 2,429,217 | 10/1947 | Brasch | 250/492.3 |
| 3,197,640 | 7/1965 | Speas | 47/1.3 |
| 3,259,546 | 7/1966 | Polley | 435/173 |
| 3,283,120 | 11/1966 | Spruck | 250/492.3 |
| 3,360,646 | 12/1967 | Reiback et al. | 250/434 |
| 3,453,775 | 7/1969 | Ware | 47/58 |
| 3,527,940 | 9/1970 | Balanca et al. | 250/434 |
| 3,687,716 | 8/1972 | Steigerwald | 250/492.3 |
| 3,740,557 | 6/1973 | Kaushansky et al. | 47/DIG. 8 |
| 3,780,305 | 12/1973 | Free | 250/492.3 |
| 4,179,338 | 12/1979 | Gordon | 435/173 |
| 4,230,947 | 10/1980 | Cram | 250/492.3 |

FOREIGN PATENT DOCUMENTS

| | | | |
|---|---|---|---|
| 148702 | 2/1937 | Austria | 47/58 |
| 1129759 | 5/1962 | Fed. Rep. of Germany | 47/DIG. 8 |
| 51-2598 | 9/1968 | Japan | 250/492.3 |
| 16905 | 4/1970 | Japan | 250/433 |
| 860513 | 2/1961 | United Kingdom | 250/432 |
| 1212118 | 11/1970 | United Kingdom | 47/58 |
| 270114 | 4/1966 | U.S.S.R. | 47/DIG. 8 |
| 820701 | 4/1981 | U.S.S.R. | 47/DIG. 8 |

OTHER PUBLICATIONS

Nelson, S. O. et al, "Determining the Dielectric Properties of Grain", *Agricultural Engineering*, vol. 34, No. 9, Sep. 1953, pp. 608-610.

Soderholm, L. H. et al, "Effect of Dielectric Heating and Cathode Rays on Germination and Early Growth of Wheat", *Agricultural Engineering*, vol. 38, No. 5, May 1957, pp. 302-307.

Coolidge, W. D. et al, "Experimental Study of Cathode Rays Outside the Generating Tube", *General Electric Review*, vol. 35, No. 8, Aug. 1932, pp. 413-417.

Brown, O. A. et al, "Methods and Equipment for Low Energy Irradiation of Seeds", *Agricultural Engineering*, vol. 38, No. 9, pp. 666-669, Sep. 1957.

Baker, V. H. et al, "Lethal Effect of Electrons on Insects Infesting Wheat and Flour, Part I", *Agricultural Engineering*, Nov. 1953, vol. 34, No. 11, pp. 755-758.

*Primary Examiner*—James R. Feyrer
*Attorney, Agent, or Firm*—Nolte, Nolte and Hunter

[57] ABSTRACT

An apparatus and process for the disinfection of seeds, preferably those of grains, to prevent pathogenic organisms from being planted with the seeds, and to provide reliable disinfection without using toxic agents. The seed is irradiated by low-energy electrons with energy and dosage controlled so that the surface and regions close to the surface are exposed to the radiation with fungicidal effect. A beam of the low-energy electrons is provided by an electron gun aimed at a region within a seed-receiving chamber at which the seeds to be irradiated are caused to intercept the radiation repeatedly and on all sides. The chamber may be at atmospheric pressure or be evacuated, the latter condition requiring vacuum locks at seed inlet and outlet ports of the chamber.

16 Claims, 10 Drawing Figures

PROCESS AND APPARATUS FOR DISINFECTING SEEDS

BACKGROUND OF THE INVENTION

The present invention relates to a process and apparatus for the disinfection of seeds. This process offers advantageous handling of grain in high volume and is adapted for disinfection of the surface and the near surface layers of the seed, which can become or are infected with seed-borne pathogens. Seeds, especially grains, therefore, are to be disinfected before use. Such a disinfection is prescribed by law in many countries.

It is well known that the surfaces of seeds which may be or are attacked by seed pathogens can be disinfected with chemical substances prior to sowing.

To date, such chemical substances have been biocidals based either on heavy metals, such as aryl mercury or alkyl compounds, or on organic compounds free from heavy metals, that is, fungicides. The mercury-containing disinfecting agents have wide-reaching fungicidal effects on the pathogens without causing resistance phenomena, but also have the distinct disadvantage of exceptional toxicity. Thus the use of these materials requires special efforts to protect individuals involved in the disinfection and sowing because any careless handling of the grain so treated presents a specific hazard to man, animals and the environment. In accordance with World Health Organization regulations, no mercury-containing disinfectant compounds can be used. It was methyl mercury, of course, that caused the infamous "Minimata disease" in Japan.

Mercury-free chemical disinfectants which came out after those regulations have a lot of disadvantages compared with disinfectants containing the mercury compounds. For attaining a required universal effect, combined preparations including several substances are necessary, which results in up to a 15 to 20-fold price increase for treatment. Aside from some technological problems, their broad application can cause a build-up of immunity in some organisms. Also, several disinfectants retard germination of crops, while others have a smaller specific weight and, thus, a greater volume which impairs adherence on the seeds. In some cases, toxic and carcinogenic effects on man cannot be excluded with certainty.

In addition to disinfection by chemical processes, there are physical processes which are also known. These essentially consist of the application of steam for heating up the seeds to a temperature critical for the pathogens, as well as applications of light, microwaves or ions. Such physical processes are limited to special conditions and have proven unsuitable for large scale agricultural use.

The application of high-energy ionizing radiation in the MeV range leads to the complete exposure of the seed by transmission of the radiation therethrough. This is used for growth stimulation of crops and for disinfection of feed grains. The radiation dose selected for the first case are very low, and are in the range of a few hundred Rads. If one exceeds the growth-stimulating radiation doses, the radiation has mutagenic or phytotoxic effect. The radiation dose needed for disinfection is at least a factor of $10^3$ above the dose needed to stimulate plate growth and kills the embryo in the seed as a consequence. Thus, irradiation with high-energy ionizing radiation for disinfection is out of the question.

SUMMARY OF THE INVENTION

The main objective of the present invention is to provide a disinfection process which has a reliable fungicidal effect without phytotoxic side effects and which presents no hazard to man and environment.

An additional object of the present invention is to provide apparatus for carrying out the process. The invention makes possible an electron beam irradiation of individual seeds on all sides and on their near surface layer in a depth of from 0.02 to 0.10 mm with sufficient dosage to have a fungicidal, i.e., disinfecting effect. The irradiation of the seeds can be carried out either in a vacuum or in air. When carrying out irradiation of the seeds in a vacuum, one needs acceleration voltages for the electrons of from 25 to 75 kV; irradiation in air will require acceleration voltages of from 75 to 175 kV. The irradiation dose is in the range of from 200 k Rads to 1000 k Rads.

A significant aspect of the present invention is that, with low energies, vigor of the seed does not decrease even at a high dose of electron radiation. Complete electron transmission through the pericarp and testa of the seed does not take place, because of the smaller penetrating capability of low energy electrons. The disinfecting effect under these conditions is thus limited to the surface layers.

Apparatus capable of carrying out the process preferably includes an electron gun for the generation, acceleration and guidance of the electron beam together with the control and power supply system, a pump-down system for the generation of a vacuum, and a conveying system for the transportation and distribution of seeds in the irradiated field, which system permits an irradiation of the seeds on all sides. In the case of vacuum processing, vacuum locks are preferably employed for the seeds. If the seeds are irradiated in air, one does not need such locks and the installation there may include a beam exit window for the ejection of the electron beam from a vacuum envelope to the atmosphere.

The electron gun itself can be either of the axial or curtain type. The axial type is preferable for irradiation in a vacuum, while the curtain type is preferable for irradiation in the atmosphere.

BRIEF DESCRIPTION OF THE DRAWINGS

Reference will hereinafter be made to the accompanying drawings, in which.

DETAILED DESCRIPTION OF THE INVENTION

Figure 1:
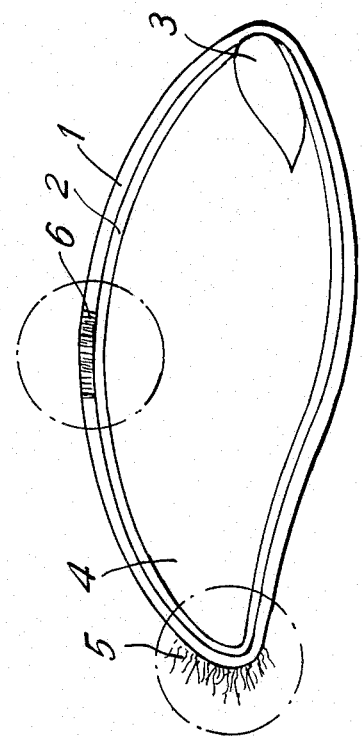
FIG. 1 is a cross sectional elevation of a wheat grain, with pathogens.

The outer shell of a grain comprises, as shown in FIG. 1, the pericarp 1 and the testa 2. In a wheat grain, the wall thickness of the pericarp 1 is from 45 to 50 μm (micrometers) and of the testa 2 is from 10 to 15 μm. Underneath the pericarp 1 and the testa 2, one finds the embryo 3 and the endosperm 4.

The pathogens affecting the seed biologically are seed-borne organisms in the form of spores 5 and as mycelium 6, residing on the outer surface and in the pericarp 1 of the grain, respectively.

In what follows will be described more precisely the effect of an electron beam on the infected seeds.

Figure 2:
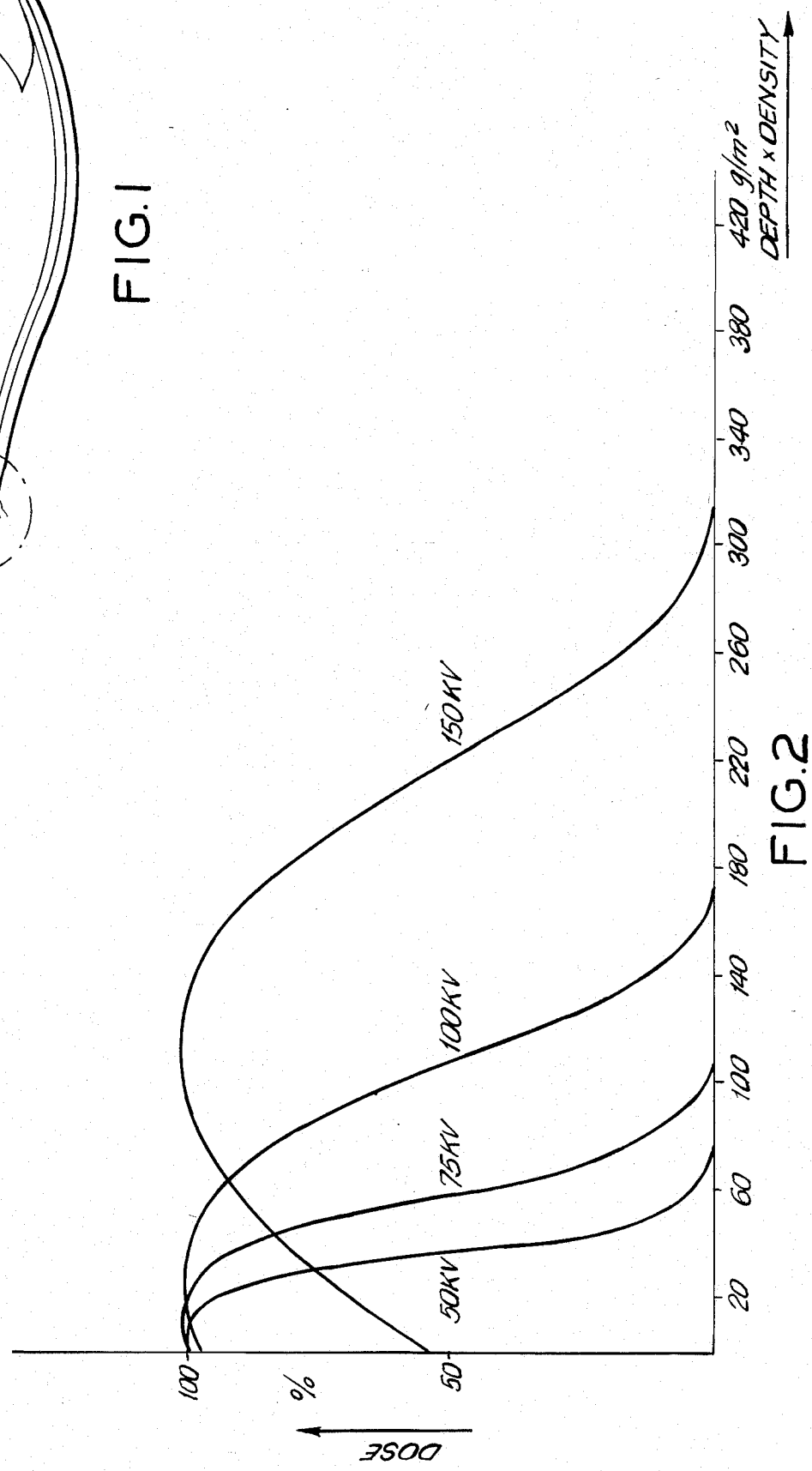
FIG. 2 is a graph in which the empirical depth dose distribution is shown at different electron energies.

The electron beam will be generated in a known manner by an electron gun. Upon impacting the grain, the accelerated electrons of the beam transfer their energy through ionization and excitation of the molecules of the irradiated materials. Too high a dose will damage the biological organism. The average depth of penetration of the electrons into the irradiated material depends on the electron energy. The electron energy absorbed by the irradiated material on irradiation in a vacuum has the indicated (FIG. 2) density distribution or dose distribution in depth. This dose distribution in depth and the biocidal effect of the electron beams decreases, beginning at the surface and asymptotically approaches zero at the inside of the near surface layer of the seed. If the tail of this dose distribution in depth, FIG. 2, approaches the embryo 3, the viability becomes impaired if the dose increases as one can see in FIG. 3.

Figure 3:
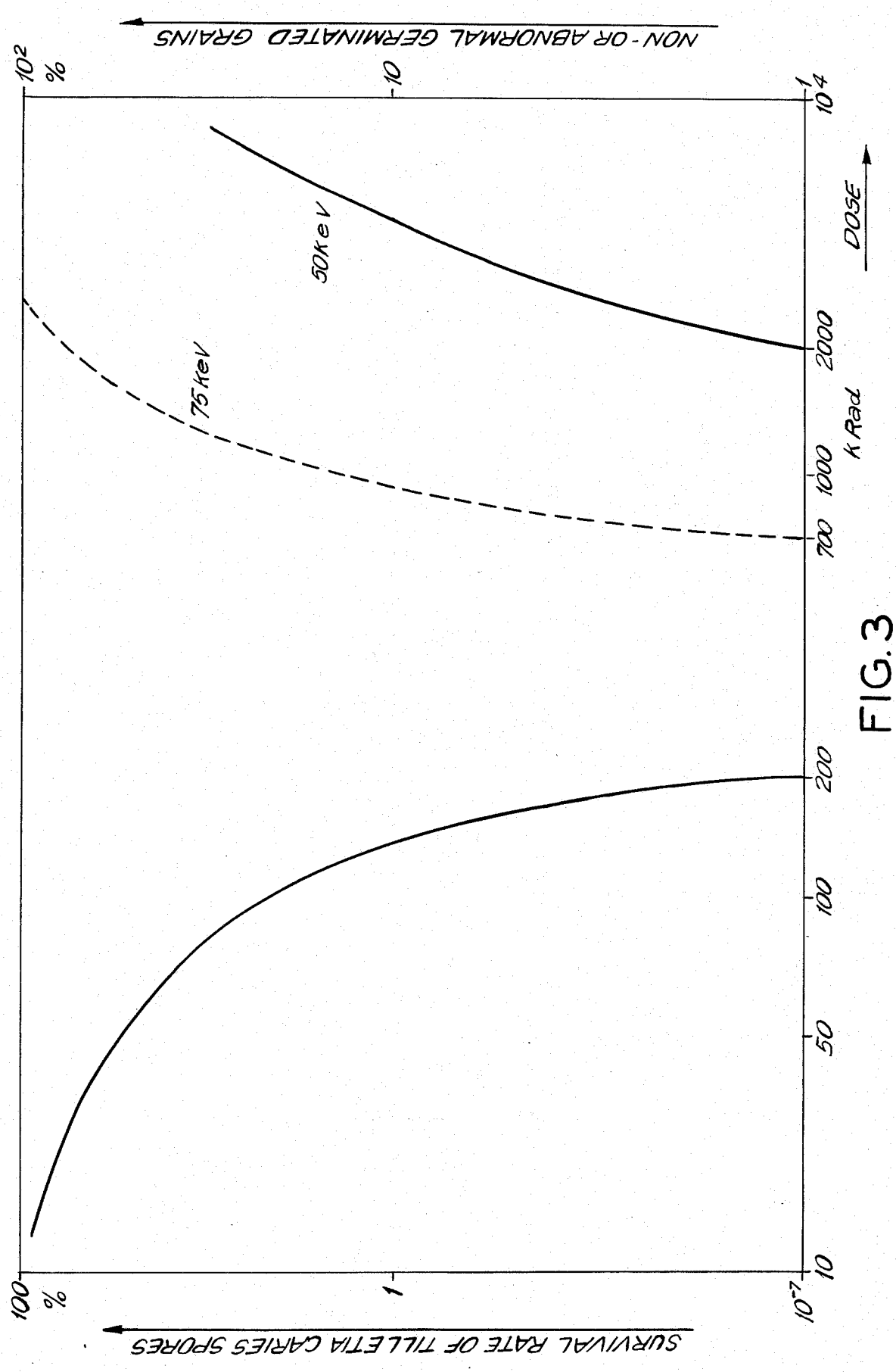
FIG. 3 is a graph showing the fungicidal and the phytotoxic effects of electron irradiation on wheat seeds infected with Tilletia caries, depending on irradiation dose and electron energy.
Figure 4A:
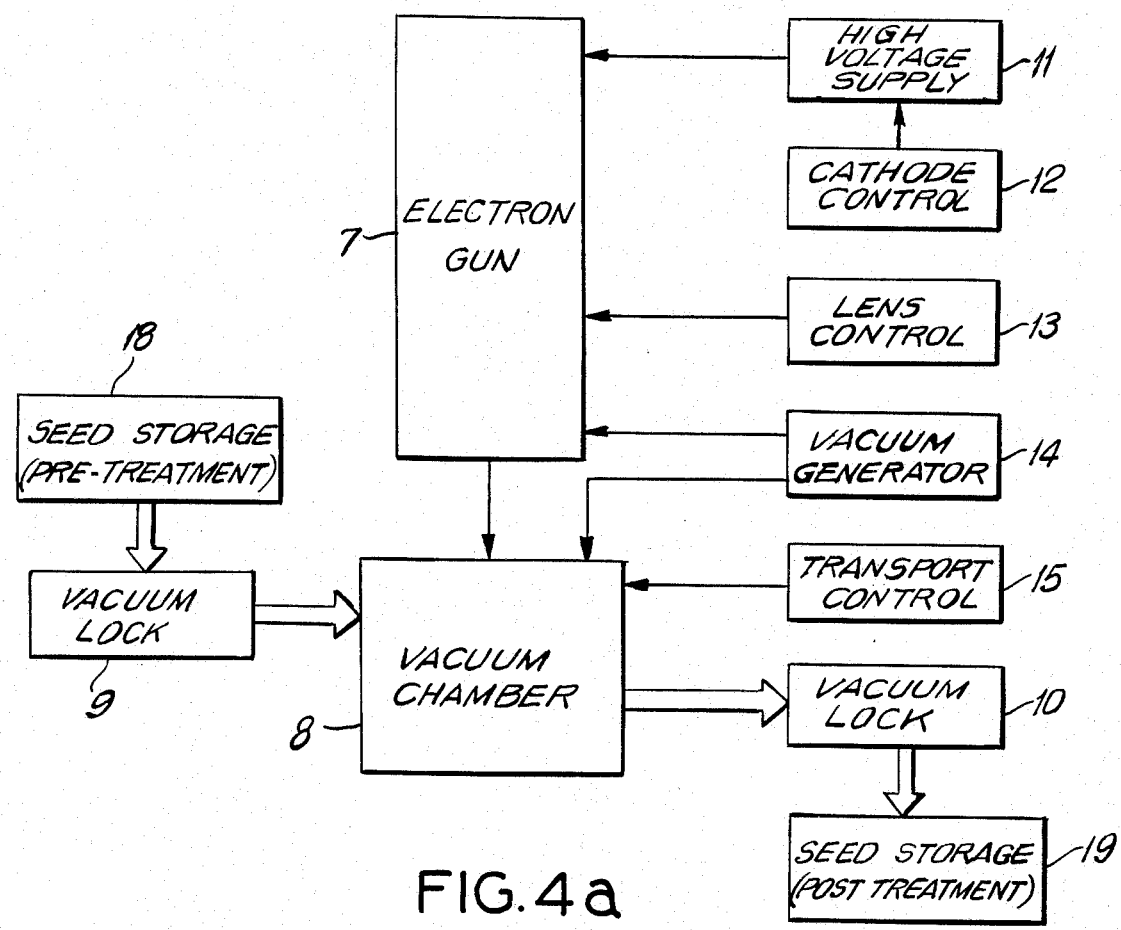
FIGS. 4a and 4b are block diagrams of installations for electron beam irradiation of seeds in a vacuum and in air, respectively.
Figure 4B:
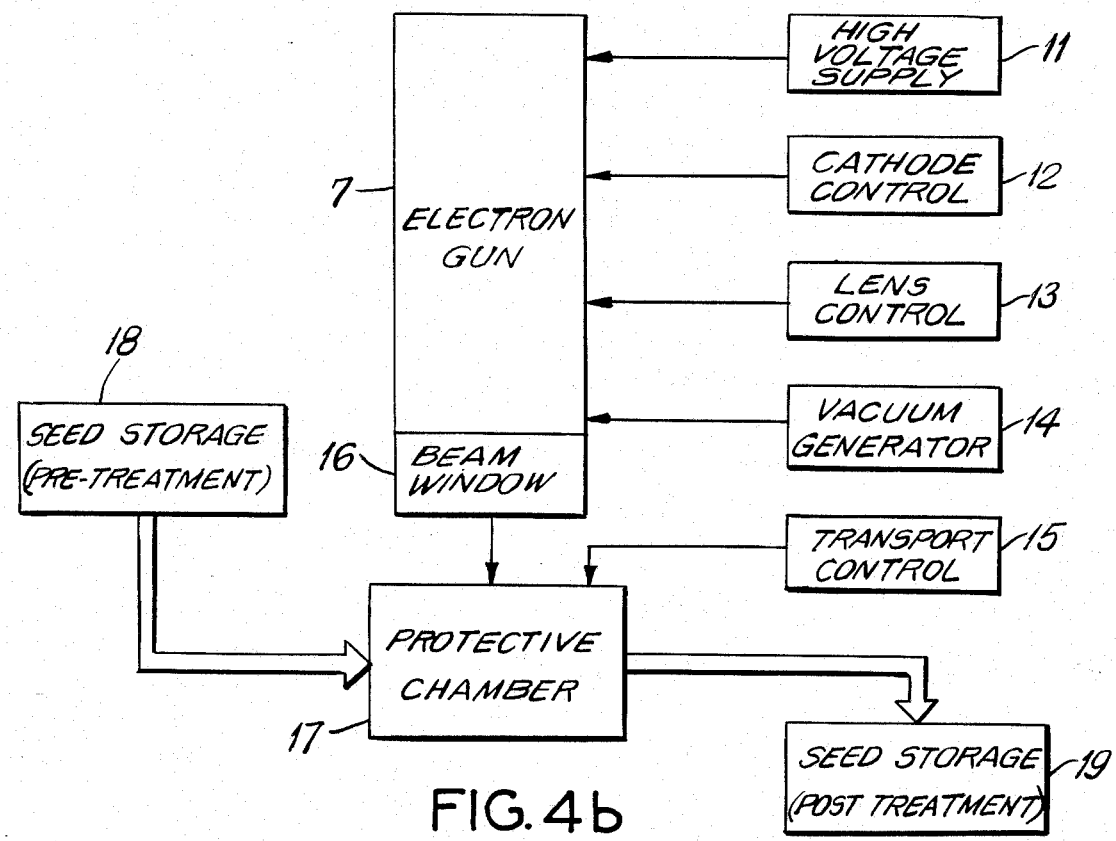

FIG. 3 shows the dependence of the survival rate of Tilletia caries spores and the relative portion of non-germinated or abnormally germinated seeds of winter wheat on irradiation dosage by electron beam irradiation in a vacuum at 50 and 75 keV energy levels.

In wheat with a total thickness of pericarp 1 and testa 2 of 0.06 mm, for example, the energy used for irradiation in a vacuum can be up to about 50 keV before the germination ability of the seed becomes affected.

FIG. 3 gives the technologically useful parameter range which is between the high doses at which the germination ability is impaired and the low doses which limit the disinfecting effect.

The lethal dose for Tilletia carries is 200 k Rad, and for *Septoria nodorum* it is 500 k Rad.

An actual implementation of an apparatus for electron beam disinfection, constructed in accordance with the invention, will now be explained with reference to FIGS. 4 through 9.

The electron beam disinfection of seeds can be carried out in vacuum or in the atmosphere (air). The installations aimed at performing the task under these two sets of conditions differ in their respective components. In the processing of seeds in a vacuum (see FIG. 4*a*), one must use an electron gun 7, a vacuum chamber 8, and vacuum locks 9 and 10 to bring in and carry out the grain from the pumped-down vacuum chamber 8. The electric function groups are: a high-voltage supply 11, cathode current and voltage supply 12, lens current supply and deflection generator 13, vacuum generator and controller 14, and transport controller 15. Upon irradiation in atmosphere (air), one will use no vacuum chamber, nor will one use vacuum locks for the seeds to be irradiated. Instead, as indicated in FIG. 4*b*, one will use a vacuum tight, beam exit window 16 through which the electron beam is brought to the atmosphere. It will be useful still to have the seeds irradiated in a confined chamber 17, for the purpose of protection from Bremsstrahlung radiation and nitrous gases formed during the process. In the process, one is able to introduce a flow of seeds to the disinfecting system and remove the disinfected seeds via the pre-treatment and post-treatment storage bins 18 and 19, respectively.

For an example of an electron beam disinfecting system for effecting seed disinfection in a vacuum, reference will now be made to an actual system, as illustrated in FIG. 5.

The electron beam 28, as shown in FIG. 5, is generated and accelerated in electron gun 7 having a beam generating system consisting of a cathode 20, a control electrode 21 and an anode 22. Here one obtains the energy E, measured in keV, which is determined by the acceleration voltage. The electron beam 28 will then be centered by an adjustment device 23 and focused by a magnetic lens 24. With the aid of a deflection system 25, electron beam 28 will be deflected by 90° and scanned by an additional deflection system 25' to fan the beam. The electron gun 7 can be also arranged at a different angle to the irradiation plane, so that by bending the beam 28 in a given angle, a perpendicular arrangement of the electron gun 7 is also possible. A programmed deflection of the electron beam 28 can be controlled by two periodically alternating deflection systems in two perpendicular directions. In such a manner, one can expose to irradiation a surface of desired size in the chamber 8 (FIGS. 5 and 6) through which one moves seeds to be processed. The vacuum generator and controller 14 is needed to produce a vacuum of $10^{-7}$ Bar in the beam generating system of electron gun 7.

The transport of the seeds from pre-treatment storage bin 18 to vacuum chamber 8 of the irradiation installation for processing, and from there to post-treatment storage bin 19, takes place via vacuum locks 9 and 10, in which the pressure is stepped from atmospheric pressure in storage bins 18 and 19 to a pressure of about $15\times10^{-5}$ Bar in vacuum chamber 8. In FIG. 5, one sees the arrangement of the vacuum locks. Other variants as, for example, introducing the seeds in a continuous flow, using the flow resistance of the grain column for control, or leading the grain over one or more star feeder wheel locks or similar movable vacuum chambers, are also part of the present invention.

We will now describe the operating principle of the apparatus illustrated in FIG. 5.

The seeds 26 drop from storage bin 18 into the multistage vacuum lock 9, through an open valve 27 thereof and enter a first lock chamber 9'. As soon as a given filling level is attained, valve 27 closes and valve 27' to the next lock chamber opens. Seeds 26 fall into a second lock chamber 9'' which was previously evacuated to a pressure of about $10^{-2}$ Bar.

While the seeds flow, a pressure equalization takes place between lock chamber 9' and 9''. Simultaneously, the seeds are degassed during dropping. After chamber 9'' is filled, lock valve 27' will close, and chamber 9'' will be evacuated to a pressure of $10^{-3}$ Bar. From preprocess chamber 29, seeds 26 will continuously be fed by means of a feed screw mechanism 30 to vacuum chamber 8. A partial pressure decoupling will be established as a consequence between preprocess chamber 29 and vacuum chamber 8 while the seed is being brought in through a channel with a seed-filled cross section. Laminar leakage of air will be materially reduced by the high flow resistance.

Figure 5:
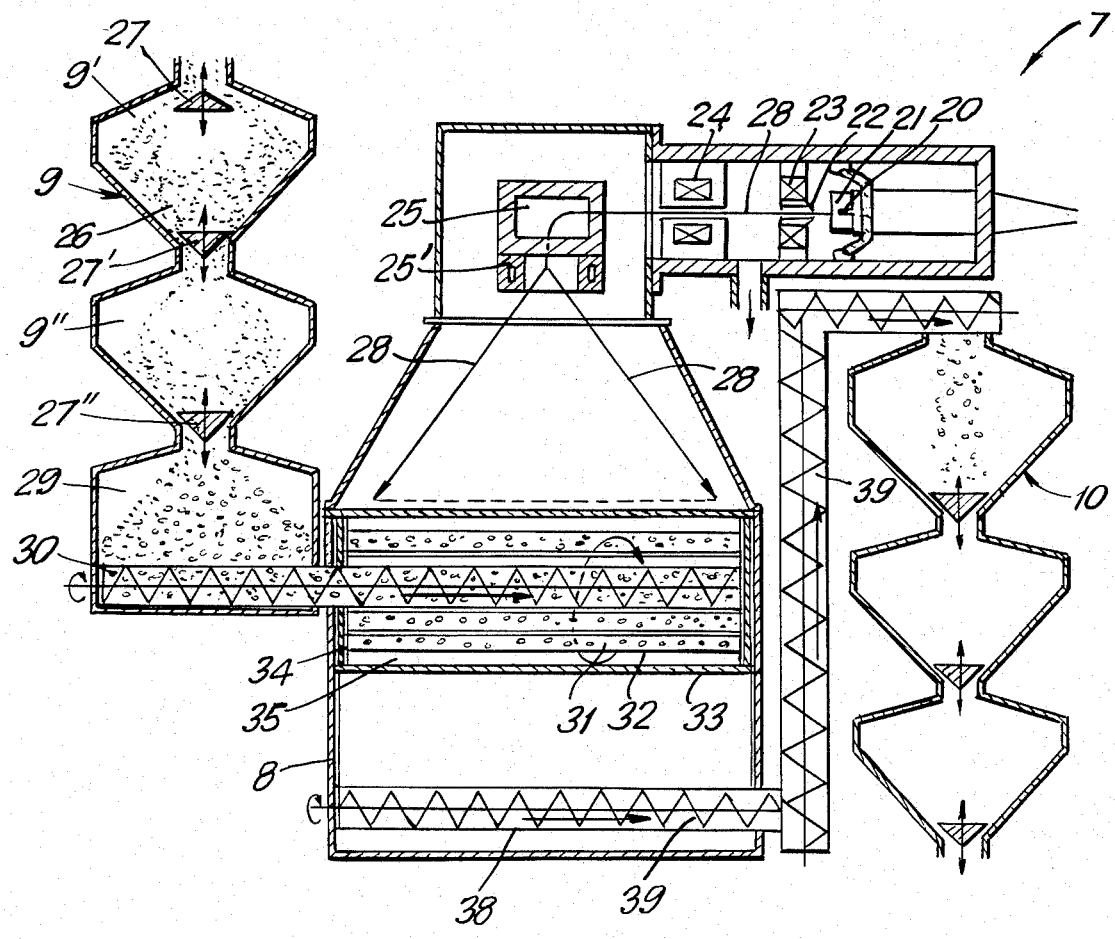
FIG. 5 is a schematic cross-sectional elevation view of an electron beam vacuum seed disinfecting system.
Figure 6:
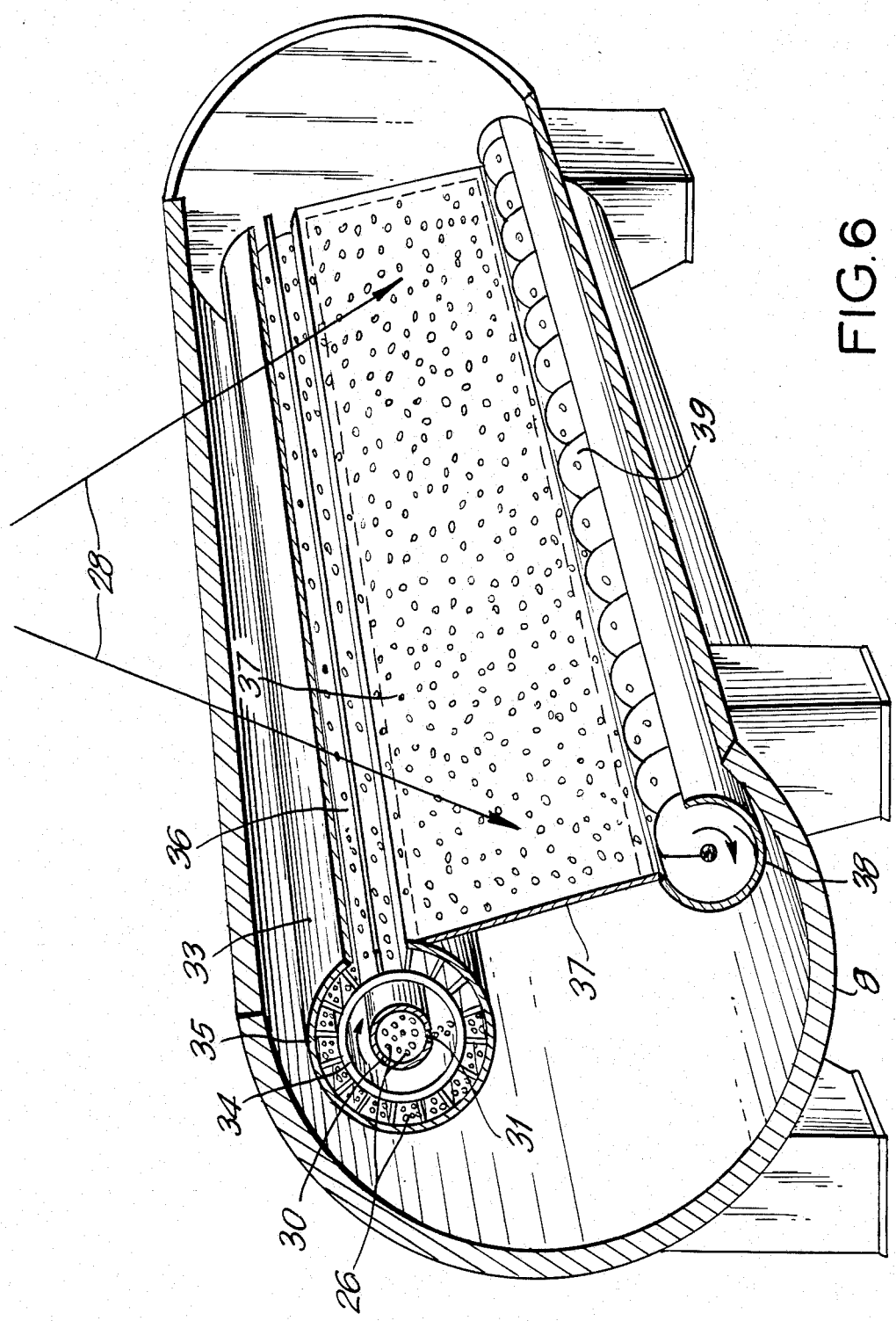
FIG. 6 is a perspective view, partially in section, of a conveying system with a single pass of the seeds through the irradiation field and with an axial feed of the seeds through a centrifugal grain conveyor.

In vacuum chamber 8, the seed is uniformly distributed through a dosing slit 31 from screw mechanism 30 into a centrifugal grain conveyor 32. FIGS. 5 and 6 show centrifugal grain conveyor 32 with a single pass of seed flow. Seed 26 falls from screw mechanism 30 through dosing slit 31 into a horizontal free standing cylinder 33 in the lower part of which grains are taken by a ribbed rotor 34 coaxial with cylinder 33, the ribs 35 also being shown.

Ribbed rotor 34 accelerates the seeds and, after three quarters of a turn, throws them through an opening 36 in cylinder 33 on to an inclined plane 37 which is water-cooled metal. It is on this plane that the flying or rolling grain will be irradiated on all sides by the scanning beam 28.

On the low end of inclined plane 37, the grain will be picked up by a transport chute 38 and moved out of vacuum chamber 8 into vacuum lock 10 by means of a screw conveyor 39. Here, also, one can use alternate means to accomplish the same task. The exit of the seeds takes place in a manner similar to the inlet via several stages in vacuum lock 10.

Figure 7:
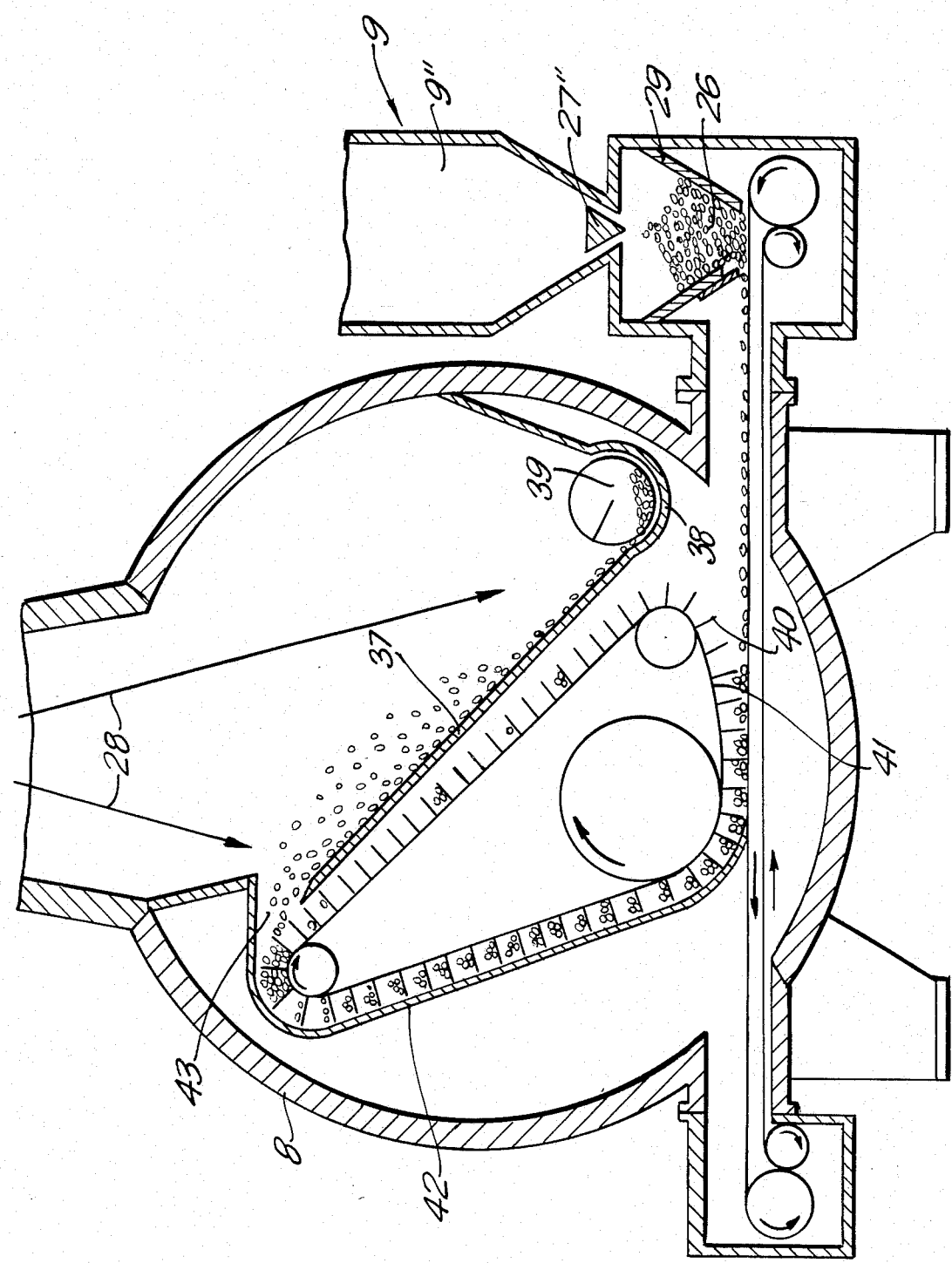
FIG. 7 is an end elevation view of a conveying system with a single pass of the seeds through the irradiation field, showing the flow of the seeds from a hopper to grain storage via a centrifugal grain conveyor.

A different concept of the single pass centrifugal grain conveyor of FIGS. 5 and 6 is shown in FIG. 7, in which like parts are given like reference numerals. The seeds in FIG. 7 are taken up by collectors 40 which are ribs integral on a moving chain or belt 41. The collectors 40 reside in a housing 42 and pick up and carry the seeds to an opening 43. In housing 42, the seed will be thrown out at a given velocity. Here, as in the previously described example, the seeds will be thrown on an inclined plane 37, making possible electron irradiation 18 on all sides of the seeds. The introduction and removal of the seeds from vacuum chamber 8 proceeds as indicated in FIG. 5.

Figure 8:
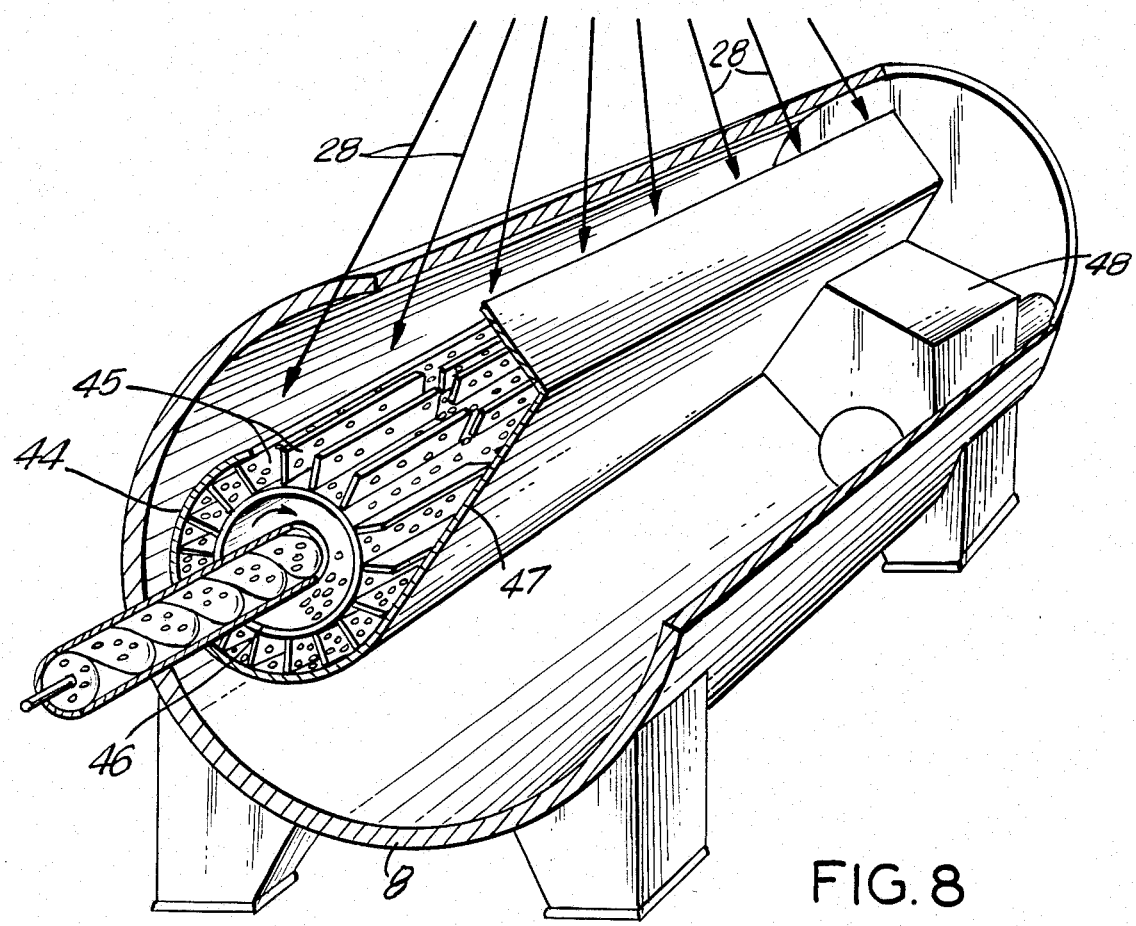
FIG. 8 is a perspective view, partially in section, showing a conveyor for multipass seed-flow through an irradiation field.

A different type of centrifugal grain conveyor is shown in FIG. 8. This is a multipass design where seeds flow several times through the irradiation field before they leave the vacuum chamber 8. As in the case of the single-pass version (FIG. 6), the seeds will be thrown out through an opening of a cylinder 44 after being picked up and accelerated by a collector rib 45 on a rotor 46. Because there is a gentle axial slope of the collector ribs 45, the seed path acquires an axial component. The flying seeds will be caught on a sloping plane 47, and again brought into cylinder 44 and then again accelerated and thrown out of the cylinder. Because of the acquired axial component, after several passes the seeds leave at the far cylinder end through a chute 48 and will be removed in the manner previously described from vacuum chamber 8.

In this manner, every seed will be irradiated several times by the electron beam 28. The collector ribs 45 can be built from steel plate with either flat or curved cross sections. They also can be made of wire brushes which are separated by uniform distances or arranged as a continuous band.

Figure 9:
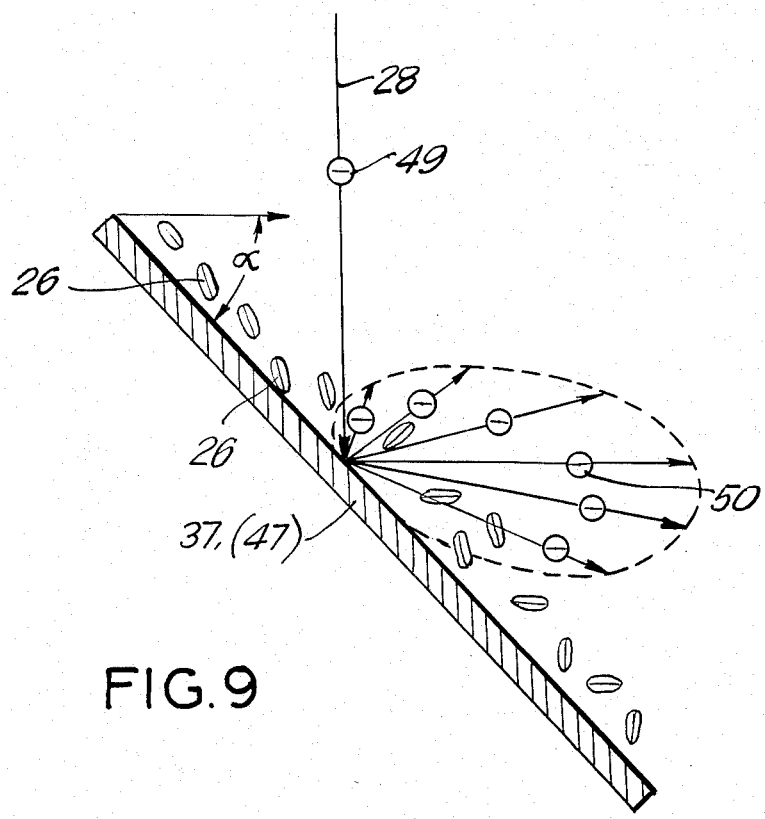
FIG. 9 is a diagram showing the effect of the electron beam on seeds in the irradiation field, and the directional distribution of backscattered electrons.

A further important aspect of the invention is that inclined planes 37 in FIGS. 5, 6 and 7, and plate 47 (FIG. 8), are so arranged as to contain an angle of at least 45°, as shown in FIG. 9. As a constructional material here, one uses metals of high atomic number, as for example Tungsten. The purpose of this selection is to make possible the reflection of the largest part of the electrons 49 from beam 28 arriving on the inclined surface, to thus increase the exposure and improve the homogeneity of exposure of seeds 26 rolling along plane 37 or 47. With this arrangement, one will increase the available reflected electrons 50. The incline angle of plane 37 or 47 also ensures better utilization of electron beam 28 and that no grain which has been processed will remain in the chamber. It also removes an obstacles to the movement possibilities of the individual seeds.

Various changes in the details, steps, materials and arrangement of parts, which have been herein described and illustrated to explain the nature of the invention may be made by those skilled in the art within the principle and scope of the invention, as defined in the appended claims.

What is claimed is:

1. A process for the disinfection of seeds, comprising: exposing said seeds on all sides thereof to irradiation by low-energy electrons generated by an electron gun; and controllably limiting the electron energy and radiation dose to ranges predetermined to destroy surface and subsurface pathogens selectively and to avoid substantial electron penetration into said seeds that would adversely affect seed germination and growth characteristics.

2. A process according to claim 1, wherein exposure of said seeds to said electrons is further controlled to be substantially uniform on all sides.

3. A process according to claim 1, wherein the exposing of said seeds to low-energy electrons is carried out in a vacuum at an electron gun acceleration voltage for the electrons of from 25 to 75 kV.

4. A process according to claim 1, wherein the exposing of said seeds to low-energy electrons is carried out at atmospheric pressure at an electron gun accleration voltage for the electrons of from 75 to 175 kV.

5. A process according to any one of claims 1 to 4, wherein the total irradiation dose is controlled to be within the range of from 200 k Rads to 1000 k Rads.

6. Apparatus for the disinfection of seeds, comprising means, including an electron gun, for exposing said seeds on all sides thereof to irradiation by a beam of low-energy electrons produced by said electron gun, and controllable means for limiting the electron energy and radiation dose to ranges predetermined to destroy surface and subsurface pathogens selectively and to avoid substantial electron penetration into said seeds that would adversely affect seed germination and growth characteristics, wherein said exposing means further includes a seed receiving chamber in which the seeds to be irradiated are continuously redistributed by movement in the path of said beam;

wherein said seed receiving chamber comprises a fixed horizontal cylinder within which is disposed a rotor having collectors arranged parallel to one another on the rotor circumference at a distance to the cylinder that is shorter then the minimum size of the seeds to be irradiated, said cylinder having a slot-like opening through which seeds accelerated in said cylinder by said rotor are thrown onto an inclined plane close to said cylinder for irradiation thereon and on all sides by said beam of low-energy electrons.

7. Apparatus according to claim 6, wherein said inclined plane is provided by a metal plate having approximately a 45° angle of inclination and dimensions compatible with the size of the irradiation field projected onto said plate by said electron gun.

8. Apparatus according to claim 7, wherein said collectors are inclined with respect to the axis of said rotor so that seeds are conveyed both in the direction of rotor rotation and in the direction of the rotor axis, the arrangement being such that seeds are fed through said fixed horizontal cylinder several times to be ejected for irradiation during one turn and returned into said cylinder.

9. Apparatus according to claim 7, wherein the collectors consist of ribs projecting radially from the circumference of said rotor.

10. Apparatus according to claim 7, wherein said metal plate is of a metal having a high atomic number, such as tungsten, to provide optimum reflection of said low-energy electrons for enhanced irradiation of the seeds thrown onto said metal plate.

11. Apparatus according to claim 6, wherein an axially arranged conveyor extends into said rotor and uniformly ejects seeds to said collectors over the total length of said rotor.

12. Apparatus according to claim 11, wherein a first conveyor device is provided for feeding untreated seeds to said chamber from the vacuum lock arrangement associated with said inlet port, and a second conveyor device is provided for feeding treated seeds from said chamber to the vacuum lock arrangement associated with said outlet port.

13. Apparatus according to claim 11, wherein said valves are conically shaped and seat on complementary sealing surfaces covered with soft gasket material.

14. Apparatus for the disinfection of seeds, comprising means, including an electron gun, for exposing said seeds on all sides thereof to irradiation by a beam of low-energy electrons produced by said electron gun, and controllable means for limiting the electron energy and radiation dose to ranges predetermined to destroy surface and subsurface pathogens selectively and to avoid substantial electron penetration into said seeds that would adversely affect seed germination and growth characteristics, wherein said exposing means further includes a seed receiving chamber in which the seeds to be irradiated are continuously redistributed by movement in the path of said beam;

wherein said electron gun is provided with deflection means for directing and fanning the low-energy electron beam upon the seeds to be irradiated in said chamber;

wherein the seed receiving chamber is connected to a vacuum pump operable to maintain said chamber evacuated during the irradiation of said seeds, said chamber having an inlet port for untreated seeds and an outlet port for treated seeds, each port being connected to a respective vacuum lock arrangement permitting passage of seeds through the port without substantially affecting the maintenance of said chamber in an evacuated state; and wherein the connection of each vacuum lock arrangement to its respective port of said seed receiving chamber is by way of a duct having a cross-section which, upon being completely filled by seeds, produces in the duct a flow resistance at a pressure resulting in laminar flow through said duct which causes additional pressure decoupling between said vacuum lock arrangements and said seed receiving chamber.

15. Apparatus for the disinfection of seeds, comprising means, including an electron gun, for exposing said seeds on all sides thereof to irradiation by a beam of low-energy electrons produced by said electron gun, and controllable means for limiting the electron energy and radiation dose to ranges predetermined to destroy surface and subsurface pathogens selectively and to avoid substantial electron penetration into said seeds that would adversely affect seed germination and growth characteristics, wherein said exposing means further includes a seed receiving chamber in which the seeds to be irradiated are continuously redistributed by movement in the path of said beam;

wherein said seed receiving chamber comprises a fixed horizontal cylinder within which endless belts carrying parallel collectors are rotatably mounted to pick up entering seeds from an underlying feed conveyor and carry them to an upper extremity of said belts to be thrown by said collectors through a longitudinal slot-like opening defined adjacent said extremity by a sheave cooperatively associated with said collectors, there being an inclined plane adjacent the downwardly moving course of said belts to receive the thrown seeds, said plane being disposed also to receive said beam of low-energy electrons, whereby said seeds undergo irradiation enroute to and on said plane.

16. Apparatus for the disinfection of seeds, comprising means, including an electron gun, for exposing said seeds on all side thereof to irradiation by a beam of low-energy electrons produced by said electron gun, and controllable means for limiting the electron energy and radiation dose to ranges predetermined to destroy surface and subsurface pathogens selectively and to avoid substantial electron penetration into said seeds that would adversely affect seed germination and growth characteristics, wherein said exposing means further includes a seed receiving chamber in which the seeds to be irradiated are continuously redistributed by movement in the path of said beam;

wherein said electron gun is provided with deflection means for directing and fanning the low-energy electron beam upon the seeds to be irradiated in said chamber;

wherein the seed receving chamber is connected to a vacuum pump operable to maintain said chamber evacuated during the irradiation of said seeds, said chamber having an inlet port for untreated seeds and an outlet port for treated seeds, each port being connected to a respective vacuum lock arrangement permitting passage of seeds through the port without substantially affecting the maintenance of said chamber in an evacuated state; and wherein each lock arrangement comprises at least two vacuum lock chambers interconnected by way of valves permitting said lock chambers to be pumped down separately and seeds to be moved from lock chamber to lock chamber.

* * * * *